United States Patent [19]
Buck et al.

[11] Patent Number: 5,661,725
[45] Date of Patent: Aug. 26, 1997

[54] TRUNK-CONDITIONING FOR RECONFIGURABLE T1 ACCESS TO NODAL SERVICES

[75] Inventors: Donald K. Buck, Wheaton, Ill.; Nhgiep T. Luu, Middletown Township, Monmouth County, N.J.

[73] Assignee: AT&T, Middletown, N.J.

[21] Appl. No.: 527,117

[22] Filed: Sep. 12, 1995

[51] Int. Cl.$^6$ .................................... H04Q 11/04
[52] U.S. Cl. .................. 370/377; 379/229; 370/384
[58] Field of Search ........................ 370/373, 377, 370/384, 426, 522, 523, 524; 379/229, 230, 231, 232, 234, 290, 337, 340, 350

[56] References Cited

U.S. PATENT DOCUMENTS

| | | | |
|---|---|---|---|
| 4,782,479 | 11/1988 | Rozema | 370/535 |
| 4,903,263 | 2/1990 | Patel et al. | 370/259 |
| 5,444,693 | 8/1995 | Arslan et al. | 370/221 |
| 5,521,972 | 5/1996 | Iki | 379/221 |

*Primary Examiner*—Wellington Chin
*Assistant Examiner*—Soon-Dong Hyun
*Attorney, Agent, or Firm*—Stephen M. Gurey

[57] ABSTRACT

Dynamic reconfiguration of T1 access channels to various Nodal (network) services can be realized by applying carefully devised trunk-conditioning signals to disconnected channels to provide proper system responses and prevent billing errors as well as unwanted alarm conditions. Trunk-conditioning with specific signals in binary sequences are defined for Terminal lines and Private Branch Exchange ("PBX") lines for the popular signalling type of E&M, LS, GS and PLAR. A steady idle signal is recommended for Terminal line conditioning; and a short duration of idle signal followed by a steady busy signal for inter-switch applications (eg. PBX to 4ESS™) while loss of connectivity exists. This technique can be used in implementing the RINA service function for services offered by AT&T and any similar service provider. The service function will allow for greater access flexibility and better utilization of access bandwidth as well as network services. It is a value added feature to Special Services (private lines), as well as other existing service offerings.

32 Claims, 10 Drawing Sheets

FIG. 1
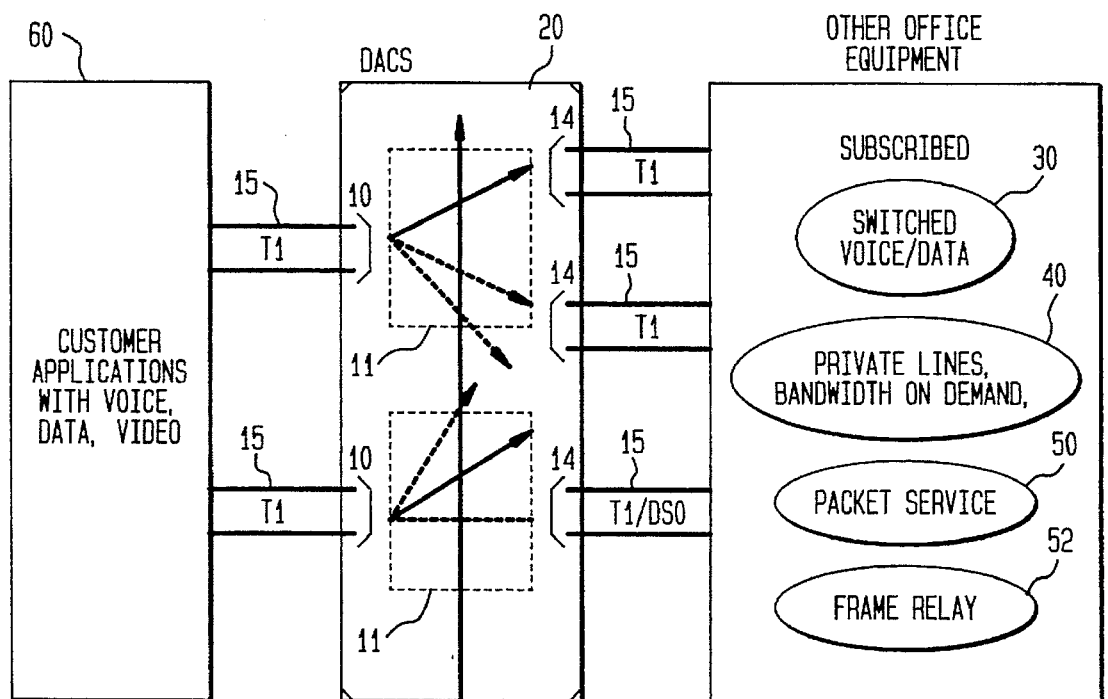
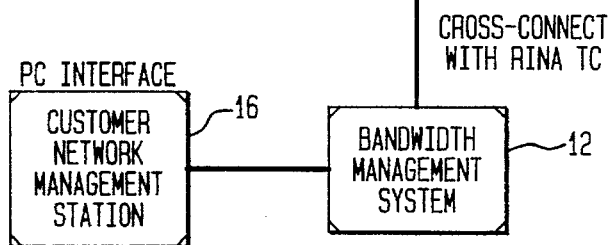
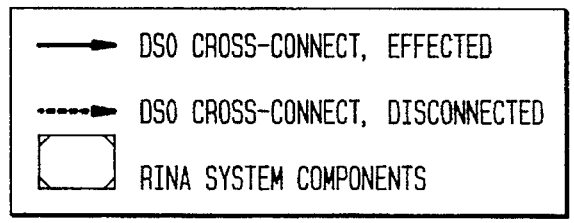

FIG. 4A

| APPLICATION TYPE | CONDITIONING CODE | | EXPECTED RESPONSE OBSERVED BY CALLING PARTY | |
|---|---|---|---|---|
| | TERMINAL LINE (ijkl, mnop), IW | PBX LINE (ijkl, mnop), IW | DISCONNECTED TERMINAL | PBX WITH DISCONNECTED LINES |
| E&M | NA | (0011, 0011), TRB | QUIET (RINGING & NO_ANSWER WITH SIGNALLING CONVERTER INSERTED AT OFFICE) | NEXT LINE/BUSY SIGNAL |
| LS | (0104, 0101), TRB | (0101, 0111), TRB | RINGING & NO_ANSWER | NEXT LINE/BUSY SIGNAL |
| GS | (1101, 0101), TRB | (1101, 0111), TRB | RINGING & NO_ANSWER | NEXT LINE/BUSY SIGNAL |
| PLAR | (1111, 1111), TRB | NA | RINGING & NO_ANSWER | NA |

FIG. 4B

| APPLICATION TYPE | CONDITIONING TYPE | EXPECTED RESPONSE OBSERVED BY CALLING CPE |
|---|---|---|
| PRIVATE LINES | TRSP, TRB | QUIET/TIMED-OUT |
| PACKET SWITCHING | TRSP, TRB | TIMED-OUT |
| FRAME RELAY | TRSP, TRB | TIMED-OUT |
| BANDWIDTH-ON-DEMAND | TRSP, TRB | QUIET/TIMED-OUT |

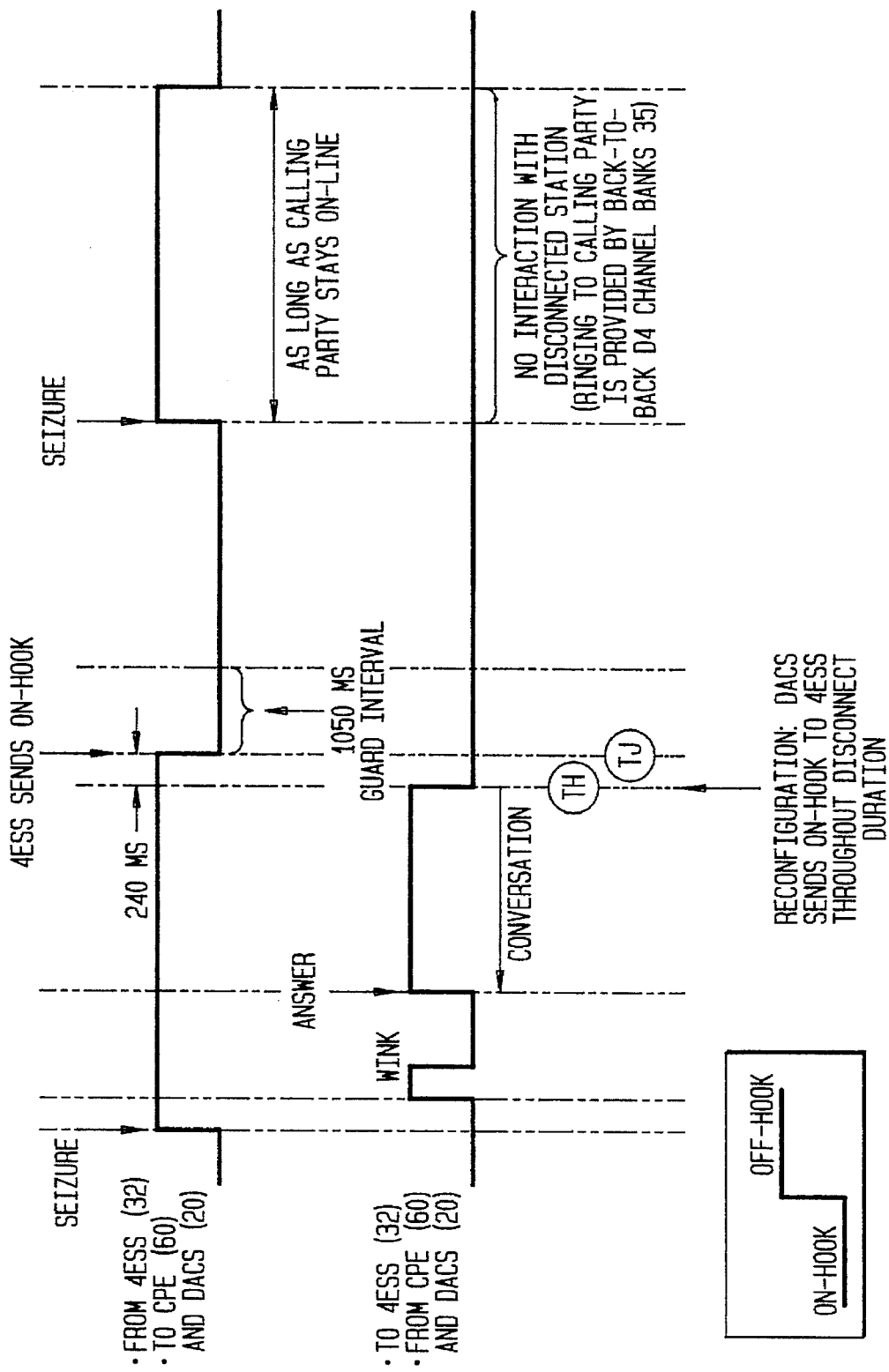

TRUNK-CONDITIONING FOR RECONFIGURABLE T1 ACCESS TO NODAL SERVICES

TECHNICAL FIELD

This invention relates generally to data, voice and video communications, and more particularly, to a T1 access arrangement providing access to multiple communications services on a dynamic and on-demand basis.

BACKGROUND OF THE INVENTION

A typical Business Communications customer in telecommunications, usually a large corporation, uses various types of communications services. These may include Switched Voice and Data, Packet, Frame Relay, Bandwidth-on-Demand, and Private Line Services.

Access configurations determining to which particular services a customer will have access at any time are currently fixed and maintained by a service provider, such as AT&T.

For switched voice applications, access circuits usually utilize a known robbed-bit signalling technique in which bits are "robbed" from a data stream and replaced with signalling information. Common types of robbed-bit signalling include Ground Start ("GS"); Loop Start ("LS"); Ear & Mouth ("E&M"); and Private Line Automatic Ringdown ("PLAR").

With the popularity of digital technology, voice (analog) signals from each phone line will usually undergo an analog-to-digital conversion by an electronic device such as a D4 channel bank employed by many Local and Inter-Exchange Carriers (such as AT&T). One voice channel, a DS0 channel, uses a bandwidth of 64 kbps (kilo-bits per second). Twenty-four DS0 channels are then combined, using the time division multiplexing technique, into a digital circuit or facility which is commonly called a "T1" (or alternatively "T1.5", or "DS1") access circuit (or alternatively "facility"). A single T1 facility thus has the capacity to carry 24 voice connections simultaneously or a combination of voice, data, and video applications on those 24 DS0 channels. Since two-way communication is usually desired, each T1, which has a bandwidth of 1.544 Mbps (mega-bits per second), is a duplex facility capable of handling two-way data transmission at a rate of 1.544 Mbps in each direction.

The T1 facilities from customer sites are usually terminated on an electronic cross-connect device when they come into the Carrier Offices. On AT&T networks, this device is known as DACS-II (Digital Access and Cross-connect System - II, or simply "DACS"). A regular DACS can handle up to 640 T1 access facilities on 640 T1 duplex ports (one T1 facility per T1 port) and can be accessed and controlled remotely from a central point for providing DS0 connections to various network services offered by the telecommunications carrier. The digital cross-connect capability of DACS also permits assignment and redistribution of DS0 channels within and between the T1 facilities which terminate on it.

In a typical Carrier Office such as for AT&T, the DACS is connected to a variety of office equipment supporting the various network services provided. For example, there are connections to intelligent 4ESS™ switching systems for AT&T's Circuit Switched Services, to a 1PSS™ for AT&T's Packet Service, to an IPX/BPX for AT&T's Frame Relay service, and possibly to another DACS for AT&T's Private Line and Bandwidth-on-Demand services.

Connection to these, as well as to other, services is typically accomplished through internal mapping, or cross-connect, of the DS0 channels administrated at the DACS. Multiple services can share a single T1 access facility, however, the cross-connect maps associated with each particular service are currently fixed and maintained by individual servia.

DACS, with a Network Management System, has the capability to reconfigure (disconnect and connect or re-connect) the cross-connects between the access facilities and the connections to network services at the transmission level (i. e, at the physical layer of the known Open System Interconnection ("OSI") reference model). This reconfiguration capability of the DACS in a network environment is known as Reconfigurable Integrated Network Access ("RINA"). However, unresolved technical issues have been encountered at higher layers (again referring to OSI model). These issues include billing errors due to the inability to detect disconnected lines, where billing may continue indefinitely on the disconnected line after customer reconfiguration, and undesired or false alarms due to improper trunk conditioning. These difficulties, among others, have prevented the implementation of RINA in the past.

Static Integrated Network Access, or "SINA", is the arrangement that currently exists. For SINA, all cross-connects at the cross-connect system are fixed once the services as subscribed are turned up. SINA does not support and provides no capability to the customer for access reconfigurations.

SUMMARY OF THE INVENTION

RINA implementation according to the present invention, is an access service function which provides customers with the capability of reconfiguring a T1 access facility that utilizes multiple network services such as switched voice/ data, Packet, Frame Relay, and Private Line services, while minimizing the impact on the network services involved. Advantages provided by RINA implementation according to the present invention include: flexible access arrangement; efficient use of access bandwidth and network services as well as cost savings due to fewer access transmission circuits needed to provide the same Nodal services.

The present invention presents a method and system for controlling access configurations in a telecommunications environment. The present invention discloses a method and system for controlling access circuit configuration. In the preferred embodiment, channels of digital access facilities and telecommunication equipment, electronically connected to form a communications path, are disconnected. A trunk conditioning code is inserted into the disconnected channels, and a new communications path is formed by electrically connecting the disconnected channel on the customer side to at least one other channel of subscribed services. The disconnected channel on the service provider side will have the trunk conditioning code applied until the next reconfiguration as directed by the customer.

BRIEF DESCRIPTION OF DRAWINGS

FIG. 1 illustrates the RINA architecture with a single DACS according to one embodiment of the present invention.

FIGS. 4A and 4B define the trunk-conditioning codes for robbed-bit and non-robbed-bit signalling types, respectively, according to the present invention.

FIGS. 5A and 5B illustrate the timing of 4ESS™ operation corresponding to trunk-conditioning for Terminal lines and trunk-conditioning for PBX lines, respectively, according to one embodiment of the present invention.

DETAILED DESCRIPTION

Figure 2:
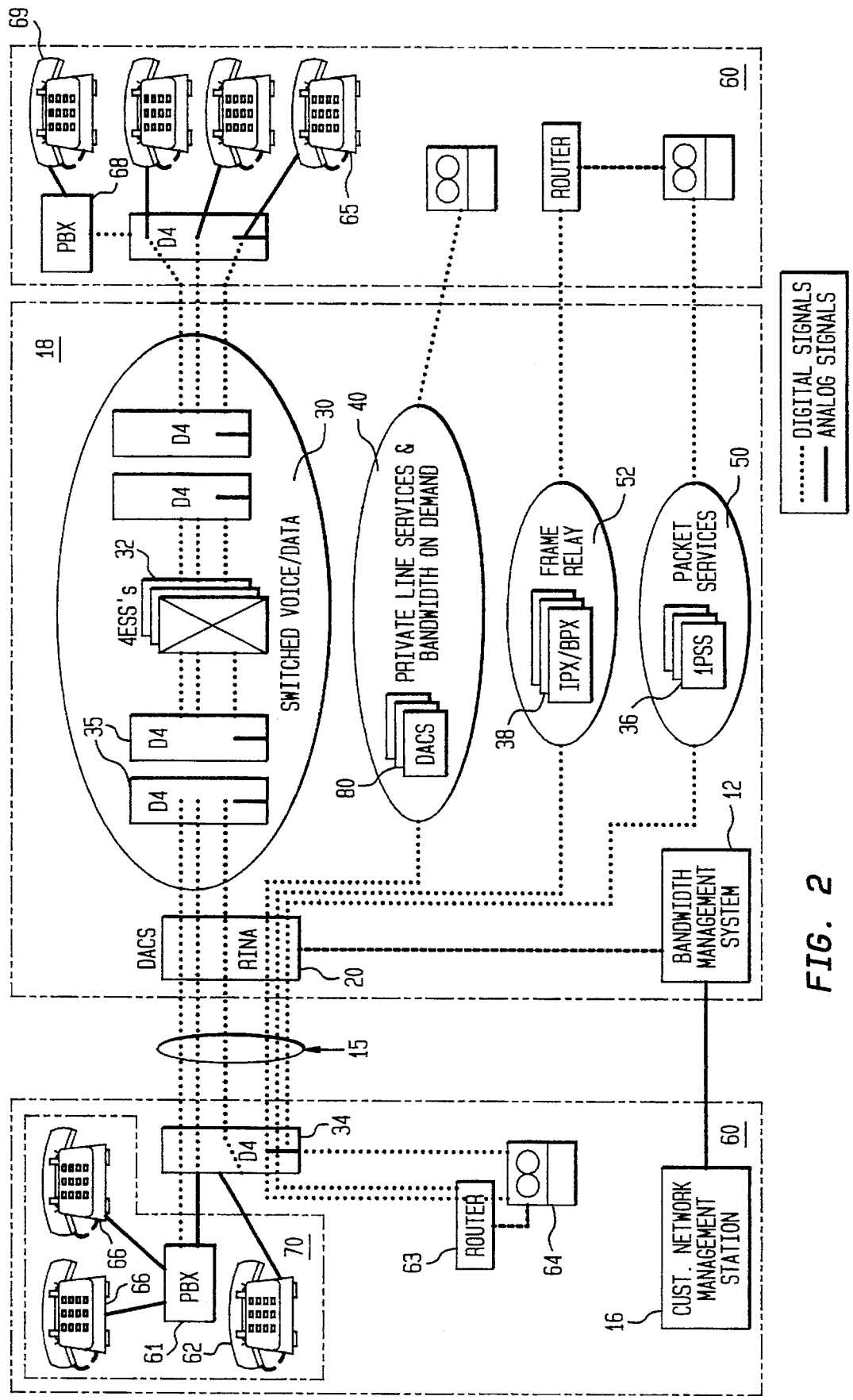
FIG. 2 illustrates the application of the RINA DACS of FIG. 1 in a communications network according to one embodiment of the invention.

FIG. 1 illustrates one embodiment of the present invention of the Reconfigurable Integrated Network Access ("RINA") service concept utilizing a single DACS 20, although multiple DACS's can be used. RINA implementation according to the present invention, provides an integrated, shared, and reconfigurable arrangement of T1 access for network services. When the T1 access (i.e., incoming) ports 10 with RINA function on a DACS 20 are reconfigured via changes in their DS0 cross-connects with the outgoing ports 14 of the DACS 20, customer access and network configurations will change accordingly. The various connections of DACS cross-connects 11 establish connection between the appropriate Customer Premises Equipment 60 and the equipment of desired services 30, 40, 50, 52.

The DACS cross-connects 11 are controlled via a bandwidth management system 12 which is an application processor through which customers' requests for changes in access configuration can be entered, interpreted and subsequently implemented on DACS 20. The bandwidth management system 12 has customer service data resident and formulates DACS commands to manage DACS cross-connects 11. The commands from the bandwidth management system 12 will direct DACS 20 to effect the configuration changes by disconnecting and re-connecting the cross-connects 11 between T1 ports, and consequently between circuits or facilities 15. The configuration changes can be from the DS0 channels on one T1 ports to another single T1 port, or from one T1 port to multiple T1 ports (10 and 14) and therefor multiple circuits or facilities 15.

In implementation of RINA according to the present invention, as applicable to AT&T networks, a customer can request an immediate change of the RINA configuration on their access facility via the RINA workcenter. Alternatively, the customer can directly communicate the required changes to the bandwidth management system via a Customer Network Control Station 16 which can be a PC or workstation. The changes are made by reconfiguring associated channel groups on the access facility. A channel group is an end to end connection entity which traverses one or multiple DACS in series and can have a bandwidth of one or multiple DS0's.

The Customer Network Control Station 16 in this embodiment of the present invention can be located either on the customer's site and forms part of Customer Premises Equipment 60 (FIG. 2) or, alternatively, it can be located in an operations center of service provider which provides contracted services to the customer. Its use and the reconfiguration responsibility fall on the customer's network manager who controls the customer premises equipment and is knowledgeable about the customer's network needs. Additional customer network control stations are also in a operations center which provides support to RINA customers.

As mentioned earlier, problems associated with prior attempts at RINA implementation with switched services which employ robbed-bit signalling include billing errors (where billing can continue after disconnects) and undesired false alarm conditions. The present invention provides proper conditioning for the disconnected channels, and thus subscribed services, to prevent these billing errors and downgrade the severity of the alarm conditions.

At the transmission level under normal circumstances, when a disconnect takes place on a channel or channels on the DACS, an Unassigned Channel Code, or "idle code", ("7F" in hexadecimal) is automatically inserted by the DACS into the disconnected channel or channels by default in both directions. A problem previously encountered here is that the unassigned channel code may make the disconnected channels appear as idle (on-hook) for some signalling types and as busy (off-hook) for others.

If "7F" appears as "busy" toward the 4ESS™ and if the channel(s) are in use ("seized") at the time of RINA disconnect, this will cause the 4ESS™ to erroneously maintain its connection with the channel(s) thus causing billing to continue for a connection which has been disconnected, or, if the disconnected channels were originally idle, the switching system would respond to the busy condition by reporting an abnormal ("High and Wet") condition.

The busy condition seen by 4ESS™ is not in and of itself an abnormal situation because the same events occur when a call is normally placed—i.e., a phone set goes "off hook" and then a number is dialed. So, normally the 4ESS™ will expect dial pulses or tones after detecting the off-hook condition. The off-hook condition without accompanying dialling information will eventually cause the 4ESS™ to remove the seized channel from service.

When a channel is subsequently reconnected at the DACS, intelligent switches, such as 4ESS™, have the capability to automatically resume the provided service without manual intervention.

FIG. 2 illustrates RINA trunk-conditioning usage and setup in an illustrative embodiment of the present invention in a network environment such as that offered by AT&T. The illustrative example of FIG. 2 includes related services such as switched voice and dam 30, Private Line and Bandwidth on Demand 40, Packet Services 52 and Frame Relay services 50.

Customer Premises Equipment 60 shown in FIG. 2 includes PBX 61 (Private Branch Exchange units); telephone sets 62, 66, routers 63 for utilizing Packet or Frame Relay services; application processors 64 (hosts/servers), and a PC 16 which is used by customers as a control station to communicate with a controller (bandwidth management system) of DACS in carrying out access reconfigurations on either an on-demand or scheduled basis.

Service Provider Equipment 18 for providing the respective services includes DACS 20 for Private Line services and RINA trunk-conditioning, 4ESS™ 32 for switched voice and data, back-to-back D4 channel banks 35 for analog to digital signaling conversions, 1PSS 36 for packet service, and IPX/BPX 38 for Frame Relay offer. The bandwidth management system 12 is an application processor that interprets and formulates the necessary commands for execution at the DACS 20.

RINA trunk-conditioning according to the present invention, with its unique set of conditioning signals as well as a special control architecture via the bandwidth management system, provides proper conditioning for the channels of a T1 facility which need to be disconnected.

For channelized voice applications, the least significant bit from the data stream is "stolen" every 6 frames to transmit signalling information. Robbed-bits for a T1 facility with a Superframe format can handle up to 4 signalling states by two signalling bits A & B. The specifications of the A/B robbed-bits for various signalling types can be found in AT&T PUB 43801, Digital Channel Bank Requirements and Objectives dated November 1982, which is incorporated herein by reference.

The four most common analog signalling types are: Ground Start ("GS"); Loop Start ("LS"); Ear & Mouth ("E&M"); and, Private Line Automatic Ringdown ("PLAR"). Each of these is converted into digital robbed-bit signalling format on the T1. According to the present invention, a two-state trunk-conditioning capability upon disconnect is required in the DACS. One state is to take (or "tear") down an on-going call if any, and the other one to busy out the channel when necessary. The defined set of codes for the conditioning signals of the present invention will allow for the proper handling of reconfigured channels. This defined set of codes is referred to as RINA trunk-conditioning codes. A table of the defined trunk-conditioning codes for the various signalling types according to one embodiment of the present invention are illustrated in FIG. 4A (described in detail below), and are entered into and reside on the bandwidth management system 12 (FIG. 2).

Figure 3:
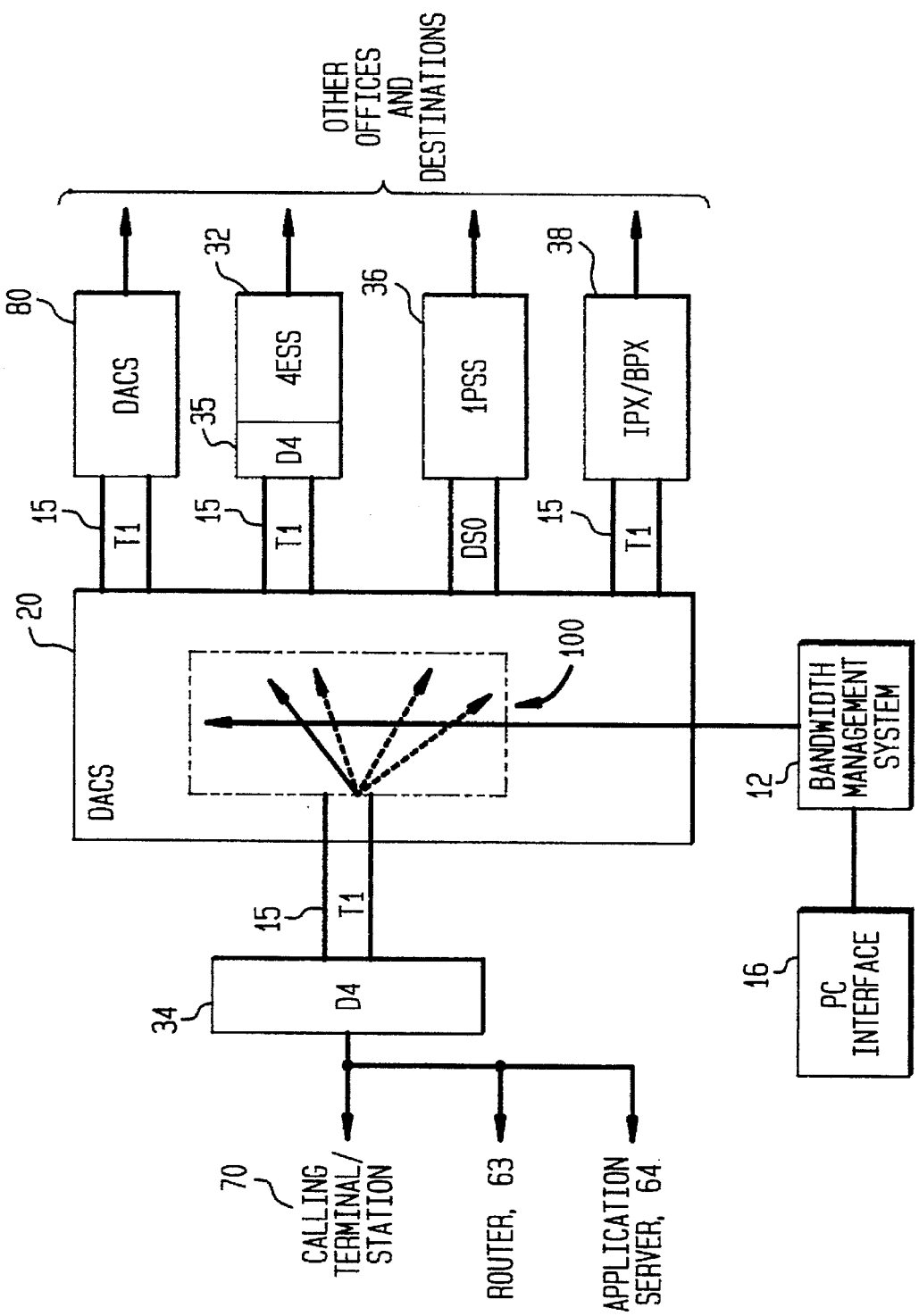
FIG. 3 illustrates the access architecture and related equipment of FIG. 1 in greater detail.

A T1 access with the RINA service function of the present invention 100, shown in FIG. 3, is an arrangement established between a calling station 70, router 63, or application server 64 on one end and service provider equipment (other DACS' 80 [those without the RINA service function], 4ESS™32, 1PSS 36 or IBX/BPX 38) on the other. The DACS 20 which supports RINA is located between the calling station 70 and the service provider equipment 80, 32, 36, 38. In one embodiment, RINA trunk-conditioning codes are transmitted to both "TO" and "FROM" terminals of the disconnected channel(s).

Changing access arrangement in this embodiment is performed by the RINA customer via a Customer Network Control Station (or "PC interface") 16. The customer network manager has control over Customer Premises Equipment 60 (FIG. 2) and is assumed to have knowledge concerning usage pattern and reconfiguration requirements. These requirements are entered via the PC interface 16 connecting to the bandwidth management system 12. In turn, the bandwidth management system 12 will formulate commands to carry out those requests and direct execution at the DACS 20. For user-friendliness, the customer will only need to specify signalling type (e.g. LS, GS etc.) at PC interface 16. Binary sequences of the RINA trunk-conditioning codes of the present invention for the specific application type is generated by the bandwidth management system 12.

When a RINA customer needs to disconnect a channel on an access circuit for other use, they are able, by virtue of the present invention, to disconnect the line connected to a specific channel to provide access to a specific Nodal service and reconnect it to another channel of another Nodal service with little or no network service impact to the service provider. The disconnect is possible and permitted regardless of whether the line at the time of disconnect is idle or busy.

The bandwidth management system 12, pursuant to a command from the Customer Network Control Station 16, will apply, via the DACS 20, the RINA trunk-conditioning codes of the present invention on the disconnected channel (s) of a T1 circuit or facility 15 based on the signalling type indicated by the customer.

Referring to FIG. 4A, trunk-conditioning codes according to the present invention are entered in a specified format, namely, "(FROM_codes, TO_codes),IW". The "FROM_codes" are the trunk-conditioning codes that need to be entered for the "FROM" terminal of DACS; "TO_codes" are those required for the "TO" terminal of DACS; and, "IW" is an insertion word which, in one embodiment, is the DACS standard trouble code "TRB" (E4 in hexadecimal). The "FROM" and "TO" codes are individually formatted as "(ijkl,mnop)", where "ijkl" and "mnop" are the signals to be applied to the FROM and TO terminals respectively. An example of a trunk conditioning code entered in this format is "(0101,0111), TRB". Determination of trunk-conditioning codes is described below with reference to FIGS. 6A–9B.

Signals "ij" and "mn" are Idle codes inserted into a disconnected channel(s) that last for the initial 2.5 seconds of the disconnect. Signals "kl" and "op" are either "Idle" or "busied-out" codes which will take over the disconnected channel(s) after the initial 2.5 seconds and remain there as long as the loss of connectivity exists (i.e., for the duration of the disconnect).

Figure 5A:
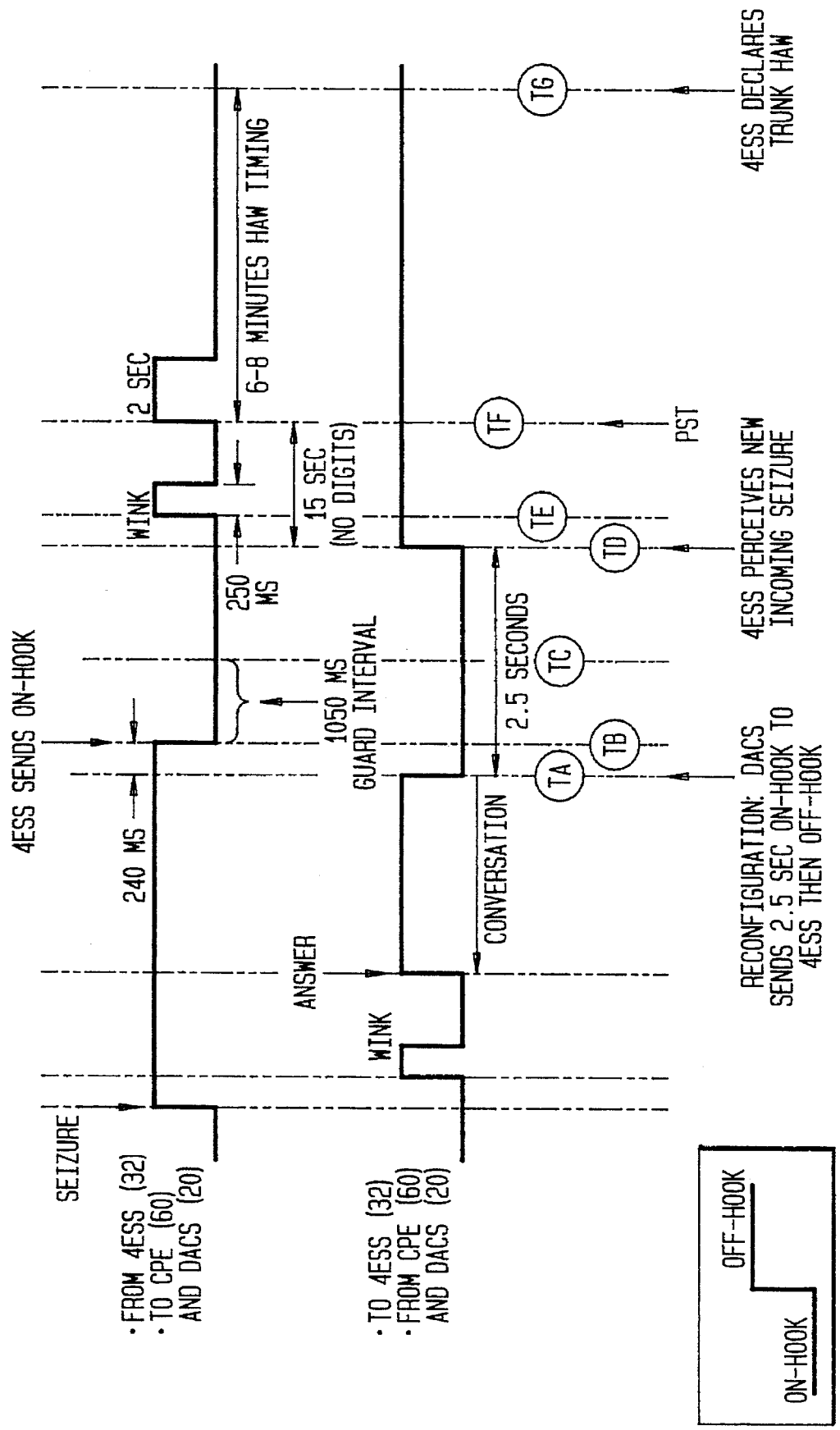

Operationally, with reference to FIG. 5A, for switched voice applications (30 in FIG. 2) when 4ESS™ 32 in one embodiment detects an on-hook sent by DACS 20 upon disconnect at TA, 4ESS™ will consider it a disconnect after approximately 240 ms at TB and consequently the billing for the call will stop if the parameter "CODSC" (on the 4ESS™) is set to "Y". 4ESS™ will then initiate a 1050 ms guard timing window for that trunk (i.e., DS0 channel), from TB to TC, during which it will not allow new calls to access the channel toward the customer (DACS). For PBX lines and trunk conditioning ("TC") codes, at the end of the 2.5-second interval, DACS will send off-hook toward 4ESS™ at TD. 4ESS™ will treat the off-hook as a new incoming trunk seizure. If the trunk is defined as a "wink" type, having an initial signal condition set to "DTMFWINK", 4ESS™ will attach a DTMF (dual tone multifrequency) receiver, send a 250 ms "wink" at TE and begin waiting for dialing digits. After 15 seconds and if no dialing digits arrive, the 4ESS™ will declare a Permanent Signal Timed-out ("PST") condition for the trunk at TF. Then, 4ESS™ will send a 2-second "off hook" at TF as an attempt to wink-off the incoming seizure. The incoming seizure will persist for the RINA application, so the 4ESS™ will eventually label the trunks as High-and-Wet after a period of 6 to 8 minutes at TG.

Referring to FIG. 5B, for Terminal lines and TC codes, the signal applied to the disconnected channel at TH is Idle (i.e., "on-hook") and it will remain so throughout the disconnect duration regardless of the behavior of the signal from 4ESS™ 32 (FIG. 2) toward the disconnected station. If the calling party tries to call the disconnected station at time TK, a seizure of the disconnected channel can be made by the 4ESS™, however, there is no further interaction between 4ESS™ and the disconnected station. The ringing heard by the calling party is provided by the back-to-back D4 Channel Banks 35 (FIG. 2). Eventually the calling party will hang up because there is no answer.

The Expected Response to a calling party calling a disconnected channel is given in the last 2 columns in FIG. 4A and is determined by the back-to-back D4 channel banks 35 in the Carrier Office serving the disconnected station. These are the feedback behaviors that are observed by callers at phone sets 65, 69 for phone set 62 or PBX 61 which utilizes the RINA service function of the present invention after the disconnect. A caller to a totally disconnected phone set 62 (i.e, a station line carried on one of the disconnected lines) will hear ringing but there is no answer ("Ringing & No$_{13}$ Answer"). For a PBX station 61 with multiple lines, the PBX or the Carrier switch will search for the next available line ("next line") and will return a busy tone if all lines have been exhausted (i.e., no unoccupied line is available).

The far end of a Terminal (phone set 62) can be another Terminal (phone set 65 FIG. 2), or a PBX 68 where using Private Line Service 40, or a Central Office ("CO") with switching systems for using Switched Voice/Data Services 30. The far end of a PBX 61 can be another PBX 68 with Private Line Service 40 or a Central Office with switching systems for using Switched Voice/Data Services 30. Keeping the disconnected Terminal line in an idle state results in ringing and no answer ("Ringing & No_Answer") to the calling party, conveying the perception to the calling party that the phone is not connected or that no one is there and therefor repeated attempts will not be successful.

For Terminal lines, except for the "kl" signal for GS signalling type, the channels are not busied out because (a) this will not result in constant ringing at the station(s), (b) it is not possible to cause billing errors for switched services, and (c), there will not be any "high and wet" conditions and trouble tickets generated. For example, if busy code "0000" is applied for the PLAR signalling type, constant ringing will result at the idle stations, or billing will continue if the end-to end channel is originally busy. Code "1100" (not selected for the PLAR signalling type) would likewise result in ringing as well.

Enhancements for RINA in alternative embodiments provide a voice message informing a caller to a disconnected station. This can be achieved by routing the disconnected channels to an intelligent device, such as AT&T's Universal Signalling Converter, that will playback a pre-recorded message or provide a pre-determined signalling tone to indicate unavailability to the caller. The response at a disconnected station for a customer using RINA (at customer site) will depend on the Customer Premises Equipment used and the access architecture which may or may not involve the RINA service provider.

RINA trunk-conditioning codes for PBX lines, determined utilizing the "reset and busied-out" approach, will send a short duration on-hook and then off-hook signal. This pattern is for stopping an on-going call, if there is one, and then busying out that disconnected channel. Busying out a disconnected PBX line will prevent its seizure from either the PBX or the 4ESS™.

Private Line 40, Packet 50, and Frame Relay 52 (FIG. 2) services do not use robbed-bit signalling and subsequently require different treatment than services that utilize robbed-bit signalling. FIG. 4B illustrates the trunk-conditioning codes for these non-robbed-bit signalling services. In this embodiment, these (i.e., Private Line, Packet, and Frame Relay) services are each handled in the same manner. DACS 20 will apply only a "Trouble Code" (E4 in hexadecimal) into the data stream and set the signalling bits to "Transparent". In other words, the DACS 20 will send E4 continuously to both sides of disconnected channels, no data bits are stolen and no signalling manipulation occurs. The RINA trunk-conditioning codes for disconnected channels associated with Packet, Frame Relay or Private Line services is entered as "TRSP,TRB".

FIGS. 6A–9B are state diagrams for the four robbed-bit signalling types under normal operation as observed at the DACS 20. The signals observed at the DACS 20 from the stations 70 and the 4ESS™ 32 have undergone signal conversion by the D4 channel bank 34 and back-to-back D4 channel bank 35. The trunk-conditioning codes inserted into the A and B signalling bits according to this embodiment of the present invention are derived from these states.

Figure 6A:
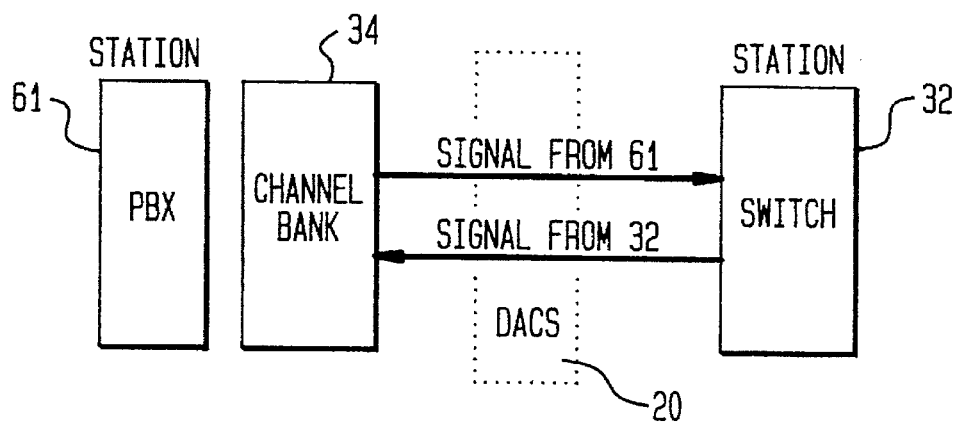
FIGS. 6A and 6B illustrate Ear & Mouth communications architecture and a state diagram for the Ear & Mouth signalling type.

Depicted in FIG. 6A is an illustrative example of Ear & Mouth ("E&M") signalling for establishing a connection between two stations. In this embodiment of the present invention, one station, typically on the customer site, comprises a PBX 61. PBX 61, in this embodiment, interfaces with a Channel Bank 34 for analog to digital signal conversion as necessary and multiplexing. The other station in this embodiment, typically a service provider switch, is a 4ESS™ 32. The line from PBX 61 can be terminated directly on the 4ESS™ 32 since signalling conversion by back-to-back D4 channel banks 35 is not needed. DACS 20 with RINA implementation according to the present invention is located between the stations PBX 61 and 4ESS™ 32 to regulate their connection.

Figure 6B:
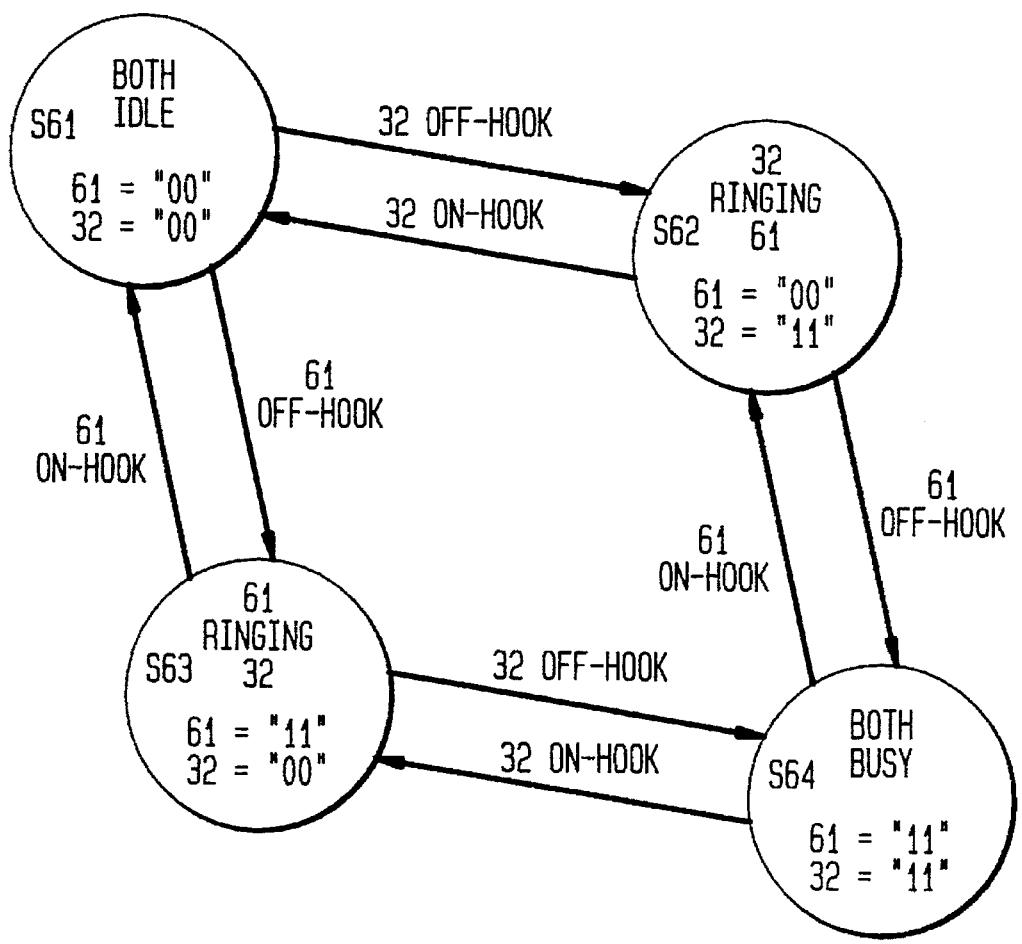

An illustrative state diagram for E&M signalling shown in FIG. 6B has four states S61, S62, S63 and S64. The initial or the idle state is S61. S62 and S63 are transient states when one end goes off-hook and the other goes on-hook. S64 is the final state of the line when end-to-end connection exists and communication is in progress.

Beginning from the idle state S61, if PBX 61 goes off-hook, signalling bits from PBX 61 (the A/B bits) will change from "00" to "11" while signalling bits from 4ESS™ 32 remains at "00". This is the transient state S63. In state S63, after a dialing string has been sent and an end-to-end path has been established by the switching network 30, a ringing tone is sent to the destination and a separate one is returned back to PBX 61. When the station at destination goes off-hook, the signaling bits from 4ESS™ 32 will transition to "11" as indicated in state S64. In S64, the busy state, the signalling bits from both PBX 61 and 4ESS™ 32 is "11". It is in this state that an end-to-end call is in progress.

If the called party (which can be either phone set 65 or 69 of FIG. 2 and connected through 4ESS™ 32) terminates the call, they simply go "on-hook" (i.e., hang-up). When this occurs, the line enters transient state S63 with 4ESS™ 32 sending "00" and PBX 61 remaining at "11". When PBX 61 goes "on-hook" as well, signalling bits from PBX 61 are "00". This represents a return to the idle state S61.

In this embodiment, i.e., PBX 61 to 4FSS™ 32 communication, DACS trunk-conditioning of the present invention, emulates states S61 and then S64, the idle and busy states. An idle code is inserted for a duration of 2.5 seconds immediately after the disconnect. After the initial 2.5 seconds, a busy signal is inserted for the rest of the disconnect duration. The DACS trunk-conditioning code for this embodiment will therefore be (0011,0011) as shown in FIG. 4A for disconnect on a PBX line. DACS trunk-conditioning codes are sent toward both PBX 61 and 4FSS™ 32.

Since E&M signalling is not commonly used with phone sets, "NA" (i.e., "Not Applicable") is the trunk-conditioning code entered for Terminal lines.

Figure 7A:
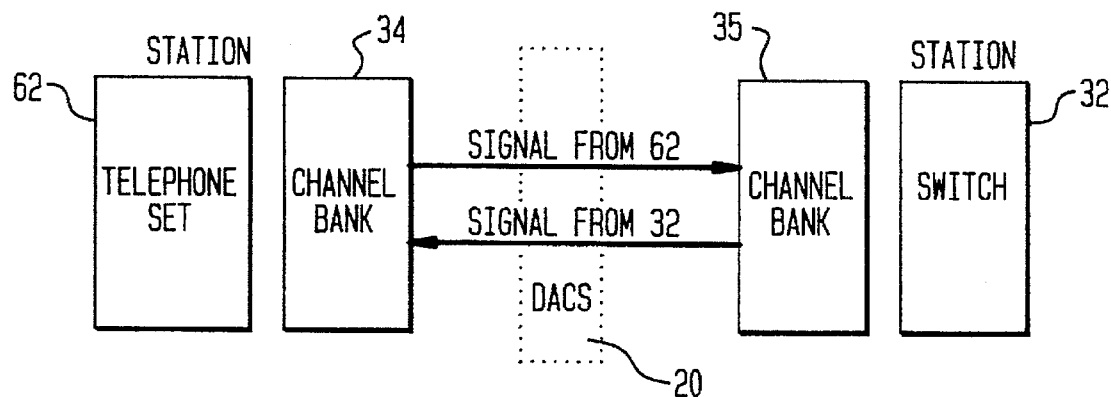
FIGS. 7A and 7B illustrate Private Line Automatic Ringdown communications architecture and a state diagram for the Private Line Automatic Ringdown signalling type.

FIG. 7A depicts an illustrative example of the transition states of the Private Line Automatic Ringdown ("PLAR") signalling in establishing a connection between two stations. In this embodiment of the present invention, one station is telephone set 62 and the other is the service provider switch 4ESS™ 32. Phone set 62 interfaces with D4 Channel Bank 34 for analog to digital signal conversions and 4ESS™ 32 with back-to-back D4 Channel Banks 35 for signalling conversion. DACS 20 with RINA implementation according to the present invention is located between phone set 62 and 4ESS™ 32 and regulates their connection.

PLAR has been used primarily with Private lines. It is unlikely to find PLAR used in conjunction in PBXs, thus no provisions in trunk-conditioning for PBX equipment are made in this embodiment of the present invention. However, provision of trunk-conditioning for PLAR used in conjunction in PBXs can be readily implemented by one of ordinary skill in the art through the teachings herein.

Figure 7B:
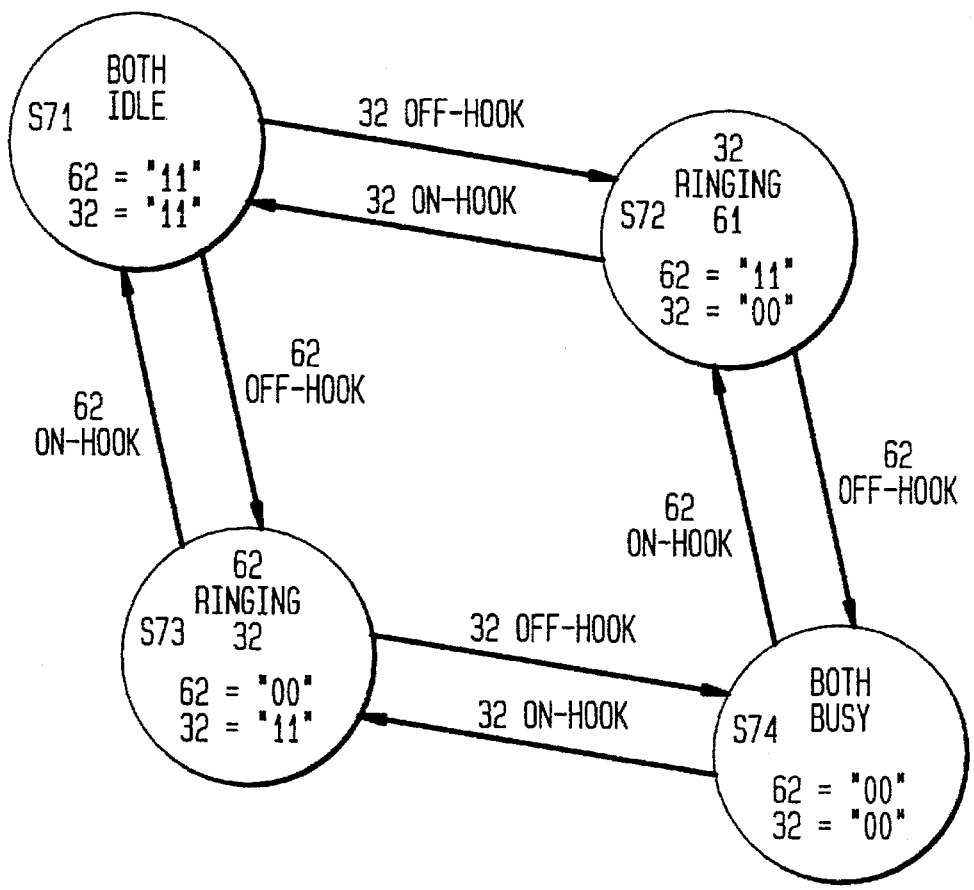

Referring to FIG. 7B, there are four states. The initial or idle state is S71. S72 and S73 are transient states when one station is on-hook and the other is off-hook. S74 is the busy state when a call is in progress. As illustrated, signalling bits from both stations (phone set 62 and 4ESS™ 32) are "11" in the idle state S71. When phone set 62 goes off-hook, the signalling bits from phone set 62 is "00" while those from 4ESS™ 32 remain "11". The line enters into the transition state S73. In state S73, a ringing signal is sent to 4ESS™ 32 and another back to phone set 62. When the destination terminal (phone set 65 or 69 from FIG. 2) answers via 4ESS™ 32, i.e., 4ESS™ 32 goes "off-hook", the signalling bits from 4ESS™ 32 will change from "11" to "00" in state S74. In S74, signalling bits from both stations (phone set 62 and 4ESS™ 32) axe "00". In state S74 the call is in progress.

When 4ESS™ 32 terminates the call by going "on-hook", transient state S73 is entered and the signalling bits from 4ESS™ 32 will become "11". When phone set 62 goes on-hook as well, signalling bits from phone set 62 axe "11" and the idle state S71 is reached.

For PLAR applications with Terminal lines, the DACS need emulate only state S71, the idle state. An idle signal is transmitted to both stations (phone set 62 and 4ESS™ 32) for the initial 2.5 seconds immediately following disconnect and for the rest of the disconnect duration as well. The DACS trunk-conditioning code in this embodiment will therefore be (1111,1111) as shown in FIG. 4A for disconnects associated with PLAR applications.

Figure 8A:
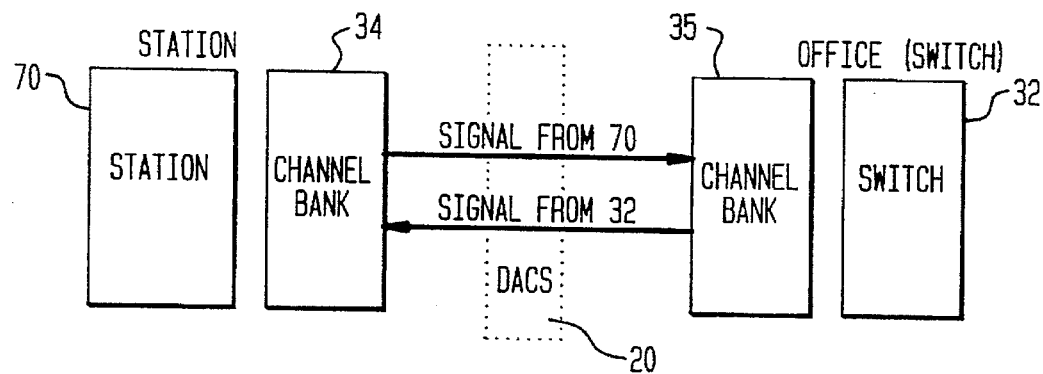
FIGS. 8A and 8B illustrate Loop Start communications architecture and a state diagram for the Loop Start signalling type.

FIG. 8A depicts an illustrative example of the state transitions of Loop Start ("LS") signalling for establishing connection between a station and a (Carrier Office/switch. The station 70 can be either a telephone set 62 with D4 channel bank 34 or a PBX 61, and the Office/switch is a circuit switching system such as a 4ESS™ 32 with back-to-back D4 channel banks 35 for signalling conversion. DACS 20 with RINA implementation according to the present invention is located between station 70 and 4ESS™ 32.

Figure 8B:
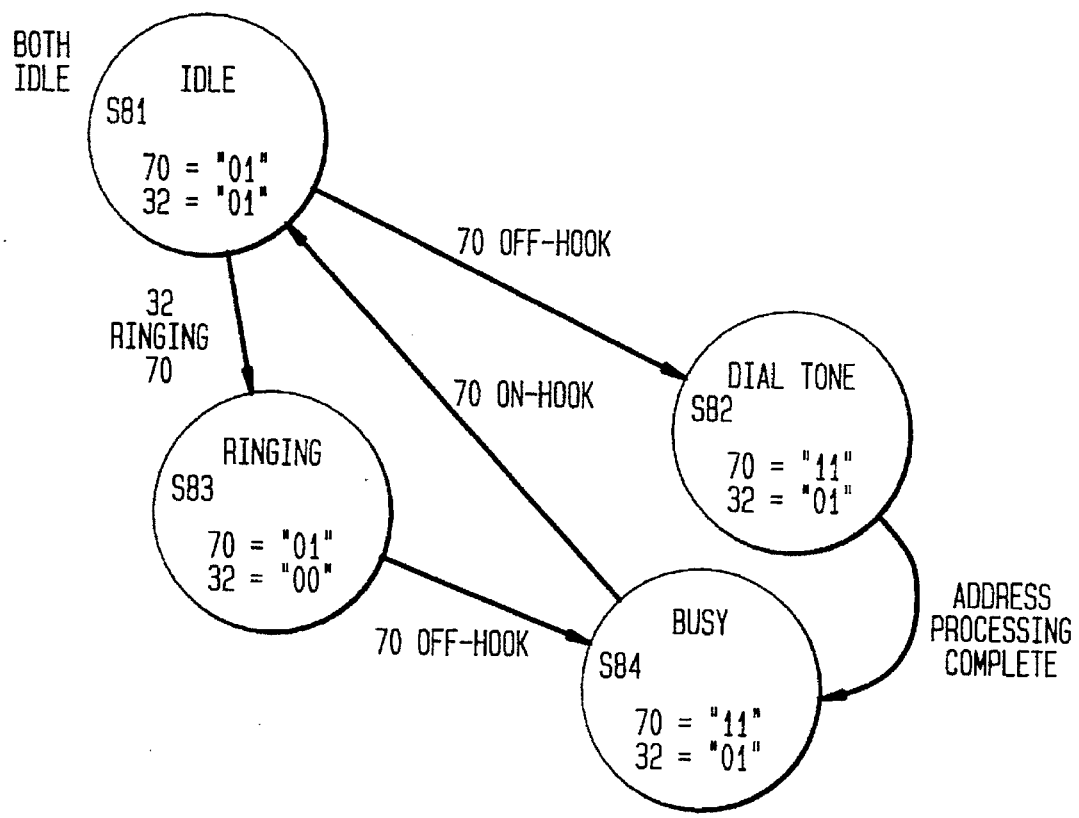

FIG. 8B is the state diagram for Loop Start signalling type communication. Four states S81, S82, S83 and S84 are shown. The idle state is S81. S82 and S83 are transient states. S84 is the busy state where a call is in progress.

Beginning from idle state S81, signalling bits from both station 70 and 4ESS™ 32 are "01". When station 70 goes off-hook, signalling bits from station 70 become "11" while 4ESS™ 32 remains "01". This is the transient state S82. Address information of the called party is now forwarded to the Office (at 4ESS™ 32), and upon completion of address processing, state S84, the busy state, is entered. In this state, the signalling bits from both station 70 and 4ESS™ 32 are "11" and "01" respectively. When station 70 hangs up (i.e., goes on-hook), the line will return to state S81. Once again the signalling bits return to "01" for both station 70 and 4ESS™ 32.

Starting from idle state S81 again, if 4ESS™ 32 is ringing station 70, state S83 is entered, where signalling bits from 4ESS™ 32 will change to "00". When station 70 answers, signalling bits from station 70 will transition from "01" to "11" as indicated in state S84, the busy state. In the state S84, the line is busy and the signalling bits are "11" and "01" for station 70 and 4ESS™ 32 respectively. When switch 70 hangs up, and thus terminates the call, idle state S81 is re-entered in the same fashion as described above.

For a customer line where station 70 is a phone set 62 with a D4 channel bank 34, only state S81 needs to be reproduced. The DACS trunk-conditioning code of this embodiment will therefore be (0101,0101) as shown in column 2 of FIG. 4A for disconnects of an LS line.

For a customer line where station 70 is a PBX 61, the DACS trunk-conditioning must emulate states S81 and S84, the idle and busy states. The idle code is sent from both station 70 and 4ESS™ 32 for a duration of 2.5 seconds immediately after the disconnect. After the initial 2.5 seconds, a busy signal is inserted for the rest of disconnect duration. The DACS trunk-conditioning code will therefore be (0111,0101) as shown in column 3 of FIG. 4A for disconnect of an LS PBX line. The DACS trunk-conditioning codes must be sent to both station 70 and 4ESS™ 32.

Figure 9A:
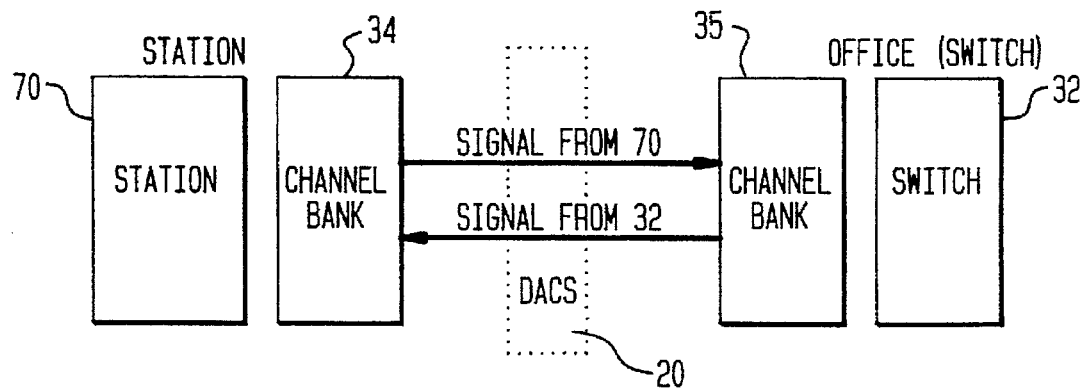
FIGS. 9A and 9B illustrate Ground Start communications architecture and a state diagram for the Ground Start signalling type.

FIG. 9A depicts an illustrative example of the state transitions for Ground Start ("GS") signalling in establishing a connection between a station and a Carrier Office/switch. Station 70 can be a telephone set 62 or a PBX 61. Carrier Office/switch is a switching system such as 4ESS™ 32 with back-to-back D4 channel banks 35 for signalling conversion. DACS 20 with RINA implementation according to the present invention is located between station 70 and 4ESS™ 32.

Figure 9B:
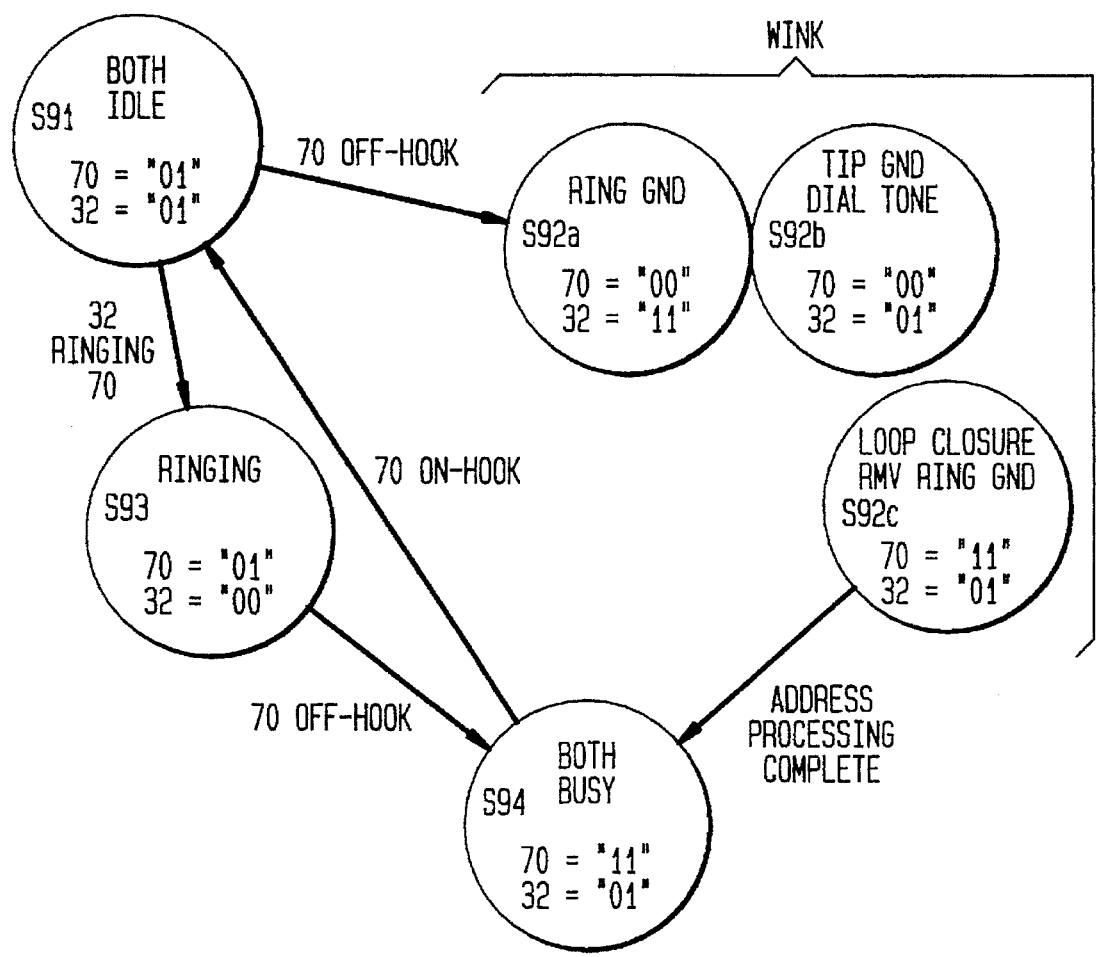

FIG. 9B provides the state diagrams for Ground Start signalling type communication. State S91 is the idle state; state S92 (comprising interim states S92a, S92b, and S92c) and S93 are transient states; and, S94 is the busy state.

Beginning from the idle state S91, signalling bits from station 70 and 4ESS™ 32 are "01" and "11" respectively. When station 70 goes off-hook (i.e., "grounds the ring lead"), the signalling bits from station 70 transition from "01" to "00" while the signalling bits from 4ESS™ 32 remains "11" as indicated in state S92a. When 4ESS™ 32 is ready to receive the dial pulses, it sends "01" towards station 70 in S92b (i.e., it "grounds the tip"). Once "01" (i.e. "tip ground") is detected by station 70, it will return "11" toward 4ESS™ 32 in S92c (i.e., "remove ring ground, and close the loop") and then forward the destination address.

After the switching network 30 has completed the end-to-end path and rung the destination, the destination answers and the busy state S94 is entered. In this state, signalling bits from both station 70 and 4ESS™ 32 are "11" and "01" respectively. When station 70 hangs up (i.e., goes "on-hook") a return to state S91 will occur once again and the signalling bits become "01" and "11" for both station 70 and 4ESS™ 32 respectively.

Starting with idle state S91 again and given that a call is coming into station 70, the 4ESS™ 32 will ring station 70 by changing the signalling bits to "00" in state S93. When station 70 goes "off-hook", signalling bits from station 70 will transition from "01" to "11" as indicated in the busy state S94. Where station 70 goes "on-hook", idle state S91 is re-entered from S94.

For a customer line where station 70 is a phone set 62 with a D4 channel bank 34, only state S91 need be reproduced. The DACS trunk-conditioning code of this embodiment will therefore be (0101,1101) as shown in column 2 of FIG. 4A for GS disconnects.

For a customer line where station 70 is a PBX 61, the DACS trunk-conditioning codes must emulate states S91 and then S94, the idle and busy states respectively. In this embodiment, DACS 20 will send "11" toward station 70 and "01" toward 4ESS™ 32 for the initial 2.5 seconds after the disconnect. Then DACS 20 will send "01" toward station 70 and "11" toward 4ESS™ 32 afterward (i.e., after the 2.5 seconds). The DACS trunk-conditioning code in this embodiment will therefore be (0111,0101) as shown in column 3 of FIG. 4A for disconnects in a PBX line with GS.

Single state trunk-conditioning capability upon disconnect currently exists in DACS. It shares the predefined signals provisioned to DACS upon startup of each circuit used for Carrier Group Alarms (i.e., T1 alarms). To support two-state trunk-conditioning for RINA upon disconnects according to the present invention, in addition to enhancements to the PC interface and the bandwidth management system given in the preferred embodiment, the DACS is enhanced, as would be understood by one skilled in the art, to effect two separate codes upon disconnect. This enhancement of DACS provides for two separate user defined signals in each direction of the disconnected channel as described above (i.e. 2.5 seconds for the first signal, and the rest of the disconnect duration with the second signal) for implementation of RINA according to the present invention.

Proper settings on the switching system are also required in implementing the present invention. In the preferred embodiment, the switching system is AT&T's 4ESS™, as discussed in technical detail in "Technical Specifications and Operation of the 4ESS", The Bell System Technical Journal, Volume 56, Number 7 (September 1977), which is incorporated herein by reference.

These settings, as will be understood by one skilled in the art, encompass selection from existing options on the utilized switching systems as follows.

First, no-wink is assumed for the outgoing signal on Terminal lines and thus the 4ESS™ switch needs to be provisioned accordingly. This entails selecting the "MIOP-NOP" option for the outgoing signalling characteristic. Selecting this option will disable the 4ESS™ switch from expecting a wink as part of the normal operation. This option is required to prevent unnecessary no-wink trouble tickets from being generated by Operations Support System(s) and thus the accompanying trouble shooting that would be initiated by service provider in response to those trouble tickets.

Secondly, the 4ESS™ switch must also be provisioned to disable any Time Release Disconnect feature. This ensures that the switch will drop an on-going call within 2.5 seconds upon detection of an "on-hook" condition instead of waiting 10 to 20 more seconds. This involves the setting of the parameter "CODSC" to "Y" on the 4ESS™ switch. This will assure that billing is terminated for calls interrupted by the RINA service function.

The disabling of the Time Released Disconnect Feature of the 4ESS™ is required since the maximum period for the initial trunk-conditioning duration, the first trunk-conditioning signal, provided by DACS is currently fixed at 2.5 seconds.

Although this invention has been described in the context of a preferred embodiment with switched services which utilize 4ESS™ switches and DACS's as the cross-connect system for access circuits, it should be readily understood by one skilled in the art that this invention will work equally well with and can be applied to other circuit switching and cross-connect systems with proper trunk-conditioning, and that the codes as defined in the preferred embodiment can be modified and broadened to cover other signalling types as required without departing from the spirit and teachings of the present invention.

We claim:

1. A method for controlling access circuit configuration, comprising the steps of:

directing a first bit stream, on a first channel, to flow to a second channel;

receiving a first command requesting that said second channel be disconnected;

disconnecting said second channel from said first channel in response to said first command;

inserting a trunk conditioning code into said second channel;

receiving a second command requesting that said first channel be connected to at least one other channel;

connecting said first channel to said at least one other channel in response to said second command; and directing a second bit stream from said first channel to said at least one other channel.

2. The method of claim 1, wherein said trunk conditioning code is also inserted into said first channel.

3. The method of claim 1, wherein said first channel is contained in a first facility and said second channel is contained in a second facility, said first facility being different from said second facility.

4. The method of claim 1, wherein said first channel is contained in a facility different than a facility containing said at least one other channel.

5. The method of claim 1, wherein said second channel and said at least one other channel are contained in a single facility.

6. The method of claim 1, wherein said second channel and said at least one other channel are contained in different facilities.

7. The method of claim 1, wherein said second bit stream is the same as said first bit stream.

8. The method of claim 1, wherein said second bit stream is not the same as said first bit stream.

9. The method of claim 1, wherein said second bit stream includes robbed-bit signalling information.

10. The method of claim 1, wherein said second bit stream does not include robbed bit signalling information.

11. The method of claim 1, wherein said trunk conditioning code comprises a first pair of codes inserted into said first channel and a second pair of codes into said second channel.

12. The method of claim 1, wherein said trunk conditioning code includes a first idle code insertion signal of a period of a fixed duration and a second insertion signal of a period of a duration corresponding to the length of time of disconnect, said second insertion signal immediately following said first insertion signal, said fixed duration of said first idle code insertion signal being of a length satisfying maximum requirements of other network components.

13. A method for controlling access circuit configuration, comprising the steps of:

directing a first bit stream, on a first channel, to flow to a second channel;

receiving a first command requesting that said second channel be disconnected;

disconnecting said second channel from said first channel in response to said first command;

inserting a trunk conditioning code into said first channel;

receiving a second command requesting that said first channel be connected to at least one other channel;

connecting said first channel to said at least one other channel in response to said second command; and directing a second bit stream from said first channel to said at least one other channel.

14. The method of claim 13, wherein said trunk conditioning code is also inserted into said second channel.

15. A method for controlling a reconfigurable electronic cross-connect device having duplex data ports and controllable electronic cross-connects, by a user interface in communication with a controller for said electronic cross-connect device, said electronic cross-connect device forming connections through said electronic cross-connects to transfer a bit stream between a first channel on one of said duplex ports and second and third channels on others of said duplex ports, said method comprising the steps of:

directing a first bit stream, on said first channel, to flow to said second channel;

selecting a trunk conditioning code based on said signalling type of a channel group associated with said second channel;

receiving a first command from said controller to disconnect said first channel from said second channel;

disconnecting said first channel from said second channel in response to said first command;

inserting said selected trunk conditioning code into said first channel and into said second;

receiving a second command from said controller requesting a new configuration to be effected on said electronic cross-connects to establish a connection between said first channel and a third channel; and connecting said electronic cross-connects of said electronic cross-connect device in response to said second command.

16. The method of claim 15, wherein said second channel and said third channel are contained in a single facility on one of said duplex ports.

17. The method of claim 15, wherein said second channel and said third channel are contained in different facilities, each said different facility being on a different one of said duplex ports.

18. The method of claim 15, wherein said trunk conditioning code is stored in a table is resident in said controller.

19. The method of claim 15, wherein said second command further requests said electronic cross-connects to establish a connection between said first channel and a fourth channel.

20. The method of claim 19, wherein said step of connecting further comprises connecting said electronic cross-connects to connect said first channel to both said third channel and said fourth channel.

21. An apparatus for controlling access circuit configuration, comprising:

means for directing a first bit stream, on a first channel, to flow to a second channel;

means for receiving a first command requesting that said second channel be disconnected;

means for disconnecting said second channel from said first channel in response to said first command;

means for inserting a trunk conditioning code into said second channel;

means for receiving a second command requesting that said first channel be connected to at least one other channel;

means for connecting said first channel to said at least one other channel in response to said second command; and means for directing a second bit stream from said first channel to said at least one other channel.

22. The apparatus of claim 21, wherein said trunk conditioning code is also inserted into said first channel.

23. The apparatus of claim 21, wherein said first channel is contained in a first facility and said second channel is contained in a second facility, said first facility being different from said second facility.

24. The method of claim 21, wherein said first channel is contained in a facility different than a facility containing said at least one other channel.

25. The method of claim 21, wherein said second channel and said at least one other channel are contained in a single facility.

26. An access service system comprising:

a reconfigurable electronic cross-connect device having reconfigurable electronic cross-connects;

a plurality of digital access facilities, each of said facilities having a plurality of channels for carrying communication data, and each of said facilities electrically connecting said customer stations, said reconfigurable electronic cross-connect devices, and said carrier stations;

said electronic cross-connects directing said communications data to flow on a first path between a channel of a first facility of said plurality of facilities and a channel of a second facility of said plurality of facilities;

a user interface for submitting reconfiguration requests for a specific channel group with a specific signalling type from a plurality of signalling types; and a controller in communication with said user interface for controlling said reconfigurable electronic cross-connect device, said controller storing a plurality of trunk-conditioning codes and capable of selecting a trunk-conditioning code from said plurality of trunk-conditioning codes stored therein, said controller being in communication with said reconfigurable electronic cross-connect device for disconnecting said channel of said first facility and said channel of said second facility at said reconfigurable electronic cross-connect device as directed by a first command, said controller inserting said selected trunk-conditioning code into said channel of said first facility and said channel of said second facility while said channel of said first facility and said channel of said second facility are disconnected, said controller further controlling configuration of said electronic cross-connects in response to said selected configuration via a second command thereby allowing said communication dam to flow along a second path established between said channel of said first facility and a channel of a third facility as determined by said second command.

27. The access service system of claim 26, wherein said reconfigurable electronic cross-connect systems is a digital access and cross-connect system.

28. The access service system of claim 26, wherein said user interface is a workstation.

29. The access service system of claim 26, wherein said user interface is a PC.

30. The access service system of claim 26, wherein said digital access facility on customer side includes DS0 channels and is a T1 access circuit.

31. The access service system of claim 26, wherein said second command further requests said electronic cross-connects to establish a connection between said first channel and a fourth channel.

32. The access service system of claim 31, wherein said step of connecting further comprises connecting said electronic cross-connects to connect said first channel to both said third channel and said fourth channel.

* * * * *